United States Patent
Shen

(10) Patent No.: US 10,642,539 B2
(45) Date of Patent: May 5, 2020

(54) READ/WRITE PATH DETERMINING METHOD AND APPARATUS

(71) Applicant: Huawei Technologies Co., Ltd., Shenzhen, Guangdong (CN)

(72) Inventor: Canquan Shen, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 264 days.

(21) Appl. No.: 15/663,570

(22) Filed: Jul. 28, 2017

(65) Prior Publication Data

US 2018/0018135 A1  Jan. 18, 2018

Related U.S. Application Data

(63) Continuation of application No. PCT/CN2015/077479, filed on Apr. 27, 2015.

(30) Foreign Application Priority Data

Jan. 30, 2015  (CN) .......................... 2015 1 0050407

(51) Int. Cl.
*G06F 3/06* (2006.01)
*G06F 12/10* (2016.01)
*G06F 12/109* (2016.01)

(52) U.S. Cl.
CPC .......... *G06F 3/0664* (2013.01); *G06F 3/0604* (2013.01); *G06F 3/0635* (2013.01); *G06F 3/0673* (2013.01); *G06F 12/10* (2013.01); *G06F 12/109* (2013.01); *G06F 3/061* (2013.01)

(58) Field of Classification Search
CPC ............. G06F 9/45558; G06F 9/45533; G06F 2212/152; G06F 3/0662; G06F 9/455
See application file for complete search history.

(56) References Cited

U.S. PATENT DOCUMENTS

| 2006/0026341 A1 | 2/2006 | Lasser |
| 2006/0112251 A1 | 5/2006 | Karr et al. |
| 2007/0214340 A1* | 9/2007 | Leveille ................... G06F 9/52 711/203 |

(Continued)

FOREIGN PATENT DOCUMENTS

| CN | 101288054 A | 10/2008 |
| CN | 101419535 A | 4/2009 |

(Continued)

*Primary Examiner* — Reginald G Bragdon
*Assistant Examiner* — Thanh D Vo
(74) *Attorney, Agent, or Firm* — Fish & Richardson P.C.

(57) ABSTRACT

The present disclosure discloses a read/write path determining method and apparatus. The method is used by a physical host. The method includes: obtaining, by the host, a first read/write request of the virtual machine, where the first read/write request includes a first virtual address, searching for the first virtual address in an address translation information set, and determining to process the first read/write request by using the block device or the virtual block device according to the address translation information set and the first virtual address. According to the method and apparatus, an appropriate read/write path is determined according to a read/write request and an address translation information set, so that both storage performance and a storage function can be considered.

19 Claims, 9 Drawing Sheets

---

Obtain a first physical address and a first physical block device identifier that are corresponding to a first virtual address  — 304

Determine, according to a format of a virtual disk corresponding to the first virtual address, a first read/write identifier corresponding to the first virtual address  — 305

Create an address translation information set, where the address translation information set includes a correspondence between the first virtual address and each of the first physical address, the first physical block device identifier, and the first read/write identifier  — 306

(56) References Cited

U.S. PATENT DOCUMENTS

2011/0191540 A1    8/2011  Chiu et al.
2012/0066677 A1    3/2012  Tang
2012/0304168 A1*  11/2012  Raj Seeniraj ........... G06F 9/452
                                                                       718/1

FOREIGN PATENT DOCUMENTS

CN        102375695 A    3/2012
CN        103098043 A    5/2013
WO      2013138587 A1   9/2013

* cited by examiner

READ/WRITE PATH DETERMINING METHOD AND APPARATUS

CROSS-REFERENCE TO RELATED APPLICATIONS

This application is a continuation of International Application No. PCT/CN2015/077479, filed on Apr. 27, 2015, which claims priority to Chinese Patent Application No. 201510050407.X, filed on Jan. 30, 2015. The disclosures of the aforementioned applications are hereby incorporated by reference in their entireties.

TECHNICAL FIELD

The present disclosure relates to the computer field, and in particular, to a read/write path determining method and apparatus.

BACKGROUND

Virtualization includes computing virtualization, network virtualization, and storage virtualization. Storage virtualization provides storage and a storage service for a virtual machine, for example, performs a storage snapshot and storage live migration on the virtual machine. Currently, storage virtualization is mainly used as follows: storage is provided for the virtual machine by means of a storage frontend and a storage backend.

If storage is provided for the virtual machine by means of the storage frontend and the storage backend, when reading/writing disk data, a guest operating system (Guest OS) first sends a data read/write request to a driver of the storage frontend, and the driver of the storage frontend places the read/write request in an input output (IO) ring shared by the storage frontend and the storage backend, and then sends an interruption to the storage backend. After receiving an interruption notification, the storage backend fetches the read/write request from the IO ring, and then sends the read/write request to a path 1 or a path 2 in FIG. 1 according to a virtual machine configuration. Specifically, a path may be determined according to a virtual machine configuration file when the virtual machine is started.

In the path 1, there is no advanced storage service, or the advanced storage service relies on a storage area network (SAN) or a virtual SAN. However, the path 1 has a short path and a small storage delay, so that storage performance is relatively high. In the path 2, there is an advanced storage service, and the advanced storage service has multiple storage functions, for example, a virtual machine snapshot, virtual machine storage live migration, and virtual machine storage thin provisioning. However, the path 2 has a relatively long path and a relatively large storage delay, and consequently storage performance is relatively poor.

Currently, the virtual machine determines a path for the read/write request according to the virtual machine configuration file, and cannot flexibly use an appropriate path to process the read/write request according to a requirement of the read/write request. Consequently, both the storage performance and a storage function cannot be considered.

SUMMARY

The present disclosure provides a read/write path determining method and apparatus, so that an appropriate path may be used to process a read/write request according to a requirement of the read/write request, so as to consider both storage performance and a storage function.

According to a first aspect, a read/write path determining method is provided, and the method is used by a physical host. The physical host includes a hardware layer, a host running on the hardware layer, and a virtual machine running on the host, and the host includes a block device and a virtual block device. The method includes: obtaining, by the host, a first read/write request of the virtual machine, where the first read/write request includes a first virtual address; searching for the first virtual address in an address translation information set, where the address translation information set includes a correspondence between a virtual address and information about a physical block device, and the information about the physical block device includes a read/write identifier; and if the address translation information set includes the first virtual address, and the first read/write request is a read request, processing the first read/write request by using a block device corresponding to the first virtual address; or if the address translation information set includes the first virtual address, the first read/write request is a write request, and a first read/write identifier corresponding to the first virtual address indicates readable and writable, processing the first read/write request by using a block device corresponding to the first virtual address; or if the address translation information set includes the first virtual address, the first read/write request is a write request, and a first read/write identifier corresponding to the first virtual address indicates read-only, processing the first read/write request by using a virtual block device corresponding to the first virtual address; or if the address translation information set does not include the first virtual address, processing the first read/write request by using a virtual block device corresponding to the first virtual address.

With reference to the first aspect, in a first possible implementation manner, the information about the physical block device further includes a physical block device identifier and a physical address, and the processing the first read/write request by using a block device corresponding to the first virtual address includes: translating the first read/write request into a block device read/write request, where the block device read/write request includes a first physical address and a first physical block device identifier that are corresponding to the first virtual address; and processing the block device read/write request by using the block device corresponding to the first virtual address.

With reference to the first aspect, in a second possible implementation manner, when the address translation information set includes the first virtual address, the first read/write request is a write request, and the first read/write identifier corresponding to the first virtual address indicates read-only, the method further includes: deleting an initial record corresponding to the first virtual address from the address translation information set.

With reference to the first aspect, in a third possible implementation manner, if the address translation information set does not include the first virtual address, the method further includes: obtaining, according to the first read/write request, a first physical address, a first physical block device identifier, and a first read/write identifier that are corresponding to the first virtual address; and adding, into the address translation information set, a correspondence between the obtained first virtual address and each of the obtained first physical address, the obtained first physical block device identifier, and the obtained first read/write identifier.

With reference to the second possible implementation manner, in a fourth possible implementation manner, the method further includes: obtaining, according to the first read/write request, a first physical address, a first physical block device identifier, and a first read/write identifier that are corresponding to the first virtual address; and adding, into the address translation information set, a correspondence between the obtained first virtual address and each of the obtained first physical address, the obtained first physical block device identifier, and the obtained first read/write identifier.

With reference to any one of the first aspect, or the first to the fourth possible implementation manners, in a fifth possible implementation manner, the method further includes: determining whether to enable an advanced storage service; and the searching for the first virtual address in an address translation information set includes: searching for the first virtual address in the address translation information set if the advanced storage service is not enabled.

With reference to the fifth possible implementation manner, in a sixth possible implementation manner, the determining whether to enable an advanced storage service includes: obtaining a path switching instruction, where the path switching instruction is used to instruct whether to enable the advanced storage service; and determining, according to the path switching instruction, whether to enable the advanced storage service.

With reference to any one of the first aspect, or the first to the sixth possible implementation manners, in a seventh possible implementation manner, the information about the physical block device further includes the physical address and the physical block device identifier, and when the address translation information set includes the first virtual address, before obtaining the first read/write request, the method further includes: obtaining the first physical address and the first physical block device identifier that are corresponding to the first virtual address; determining, according to a format of a virtual disk corresponding to the first virtual address, the first read/write identifier corresponding to the first virtual address; and creating the address translation information set, where the address translation information set includes the correspondence between the first virtual address and each of the first physical address, the first physical block device identifier, and the first read/write identifier.

With reference to the seventh possible implementation manner, in an eighth possible implementation manner, the determining, according to a format of a virtual disk corresponding to the first virtual address, the first read/write identifier corresponding to the first virtual address includes: if the first virtual address is corresponding to a thick-provisioned virtual disk or a thin-provisioned virtual disk, determining that the first read/write identifier indicates readable and writable; if the first virtual address is corresponding to a differential mirror virtual disk, and the first virtual address is corresponding to a child image file, determining that the first read/write identifier indicates readable and writable; or if the first virtual address is corresponding to a differential mirror virtual disk, and the first virtual address is corresponding to a parent image file, determining that the first read/write identifier indicates read-only.

With reference to any one of the first aspect, or the first to the eighth possible implementation manners, in a ninth possible implementation manner, wherein the obtaining, by the host, a first read/write request of the virtual machine includes: obtaining a second read/write request of the virtual machine from an input output IO ring shared by a storage frontend and a storage backend, where the second read/write request includes a second virtual address; and splitting the first read/write request off from the second read/write request, where the first virtual address is a partial virtual address in the second virtual address.

According to a second aspect, a read/write path determining apparatus is provided, the apparatus is applied to a physical host, and a virtual machine runs on the physical host. The apparatus includes: a storage backend module, configured to: obtain a first read/write request of the virtual machine, where the first read/write request includes a first virtual address; and search for the first virtual address in an address translation information set, where the address translation information set includes a correspondence between a virtual address and information about a physical block device, and the information about the physical block device includes a read/write identifier; a block device, configured to process the first read/write request if the address translation information set includes the first virtual address, and the first read/write request is a read request, or if the address translation information set includes the first virtual address, the first read/write request is a write request, and a first read/write identifier corresponding to the first virtual address indicates readable and writable; and a virtual block device, configured to process, by using a virtual block device corresponding to the first virtual address, the first read/write request if the address translation information set includes the first virtual address, the first read/write request is a write request, and a first read/write identifier corresponding to the first virtual address indicates read-only, or if the address translation information set does not include the first virtual address.

With reference to the second aspect, in a first possible implementation manner of the second aspect, the information about the physical block device further includes a physical block device identifier and a physical address; the storage backend module is further configured to translate the first read/write request into a block device read/write request, where the block device read/write request includes a first physical address and a first physical block device identifier that are corresponding to the first virtual address; the block device is specifically configured to process the block device read/write request.

With reference to the second aspect, in a second possible implementation manner of the second aspect, the storage backend module is further configured to: if the address translation information set includes the first virtual address, the first read/write request is a write request, and the first read/write identifier corresponding to the first virtual address indicates read-only, delete an initial record corresponding to the first virtual address from the address translation information set.

With reference to the second aspect, in a third possible implementation manner of the second aspect, the apparatus further includes: a first obtaining module, configured to: if the address translation information set does not include the first virtual address, obtain, according to the first read/write request, a first physical address, a first physical block device identifier, and a first read/write identifier that are corresponding to the first virtual address; the storage backend module adds, into the address translation information set, a correspondence between the first virtual address and each of the first physical address, the first physical block device identifier, and the first read/write identifier that are obtained by the first obtaining module.

With reference to the second possible implementation manner of the second aspect, in a fourth possible implementation manner of the second aspect, the apparatus further includes: a first obtaining module, configured to obtain, according to the first read/write request, a first physical address, a first physical block device identifier, and a first read/write identifier that are corresponding to the first virtual address; the storage backend module is further configured to add, into the address translation information set, a correspondence between the first virtual address and each of the first physical address, the first physical block device identifier, and the first read/write identifier that are obtained by the first obtaining module.

With reference to any one of the second aspect, or the first to the fourth possible implementation manner of the second aspect, in a fifth possible implementation manner of the second aspect, the storage backend module is specifically configured to: determine whether to enable an advanced storage service; and search for the first virtual address in the address translation information set if the advanced storage service is not enabled.

With reference to the fifth possible implementation manner of the second aspect, in a sixth possible implementation manner of the second aspect, the apparatus further includes: a second obtaining module, configured to obtain a path switching instruction, where the path switching instruction is used to instruct whether to enable the advanced storage service; the storage backend module is specifically configured to determine, according to the path switching instruction, whether to enable the advanced storage service.

With reference to any one of the second aspect, or the first to the sixth possible implementation manners of the second aspect, in a seventh possible implementation manner of the second aspect, the information about the physical block device further includes the physical address and the physical block device identifier; the apparatus further includes: a third obtaining module, configured to: if the address translation information set includes the first virtual address, before the storage backend module obtains the first read/write request, obtain the first physical address and the first physical block device identifier that are corresponding to the first virtual address; and determine, according to a format of a virtual disk corresponding to the first virtual address, the first read/write identifier corresponding to the first virtual address; the storage backend module is further configured to: create the address translation information set, where the address translation information set includes the correspondence between the first virtual address and each of the first physical address, the first physical block device identifier, and the first read/write identifier.

With reference to the seventh possible implementation manner of the second aspect, in an eighth possible implementation manner of the second aspect, the third obtaining module is specifically configured to: if the first virtual address is corresponding to a thick-provisioned virtual disk or a thin-provisioned virtual disk, determine that the first read/write identifier indicates readable and writable; if the first virtual address is corresponding to a differential mirror virtual disk, and the first virtual address is corresponding to a child image file, determine that the first read/write identifier indicates readable and writable; or if the first virtual address is corresponding to a differential mirror virtual disk, and the first virtual address is corresponding to a parent image file, determine that the first read/write identifier indicates read-only.

With reference to any one of the second aspect, or the first to the eighth possible implementation manners of the second aspect, in a ninth possible implementation manner of the second aspect, the storage backend module is specifically configured to: obtain a second read/write request of the virtual machine from an input output IO ring shared by a storage frontend and a storage backend, where the second read/write request includes a second virtual address; and split the first read/write request off from the second read/write request, where the first virtual address is a partial virtual address in the second virtual address.

According to a third aspect, a physical host is provided. The physical host includes a hardware layer, a host running on the hardware layer, and a virtual machine running on the host. The host includes a block device and a virtual block device, and the host includes the read/write path determining apparatus described in any one of the second aspect, or the first to the ninth possible implementation manners of the second aspect.

Compared with the prior art, the embodiments of the present disclosure have the following beneficial effects:

Based on the foregoing technical solutions, according to the read/write path determining method and apparatus according to the embodiments of the present disclosure, an appropriate read/write path is determined according to a virtual address in a read/write request and an address translation information set, so that both storage performance and a storage function can be considered.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by persons of ordinary skill in the art based on the embodiments of the present disclosure without creative efforts shall fall within the protection scope of the present disclosure.

It should be understood that sequence numbers of the foregoing processes do not mean execution sequences in the embodiments of the present disclosure. The execution sequences of the processes should be determined according to functions and internal logic of the processes, and should not be construed as any limitation on the implementation processes of the embodiments of the present disclosure.

Figure 2:
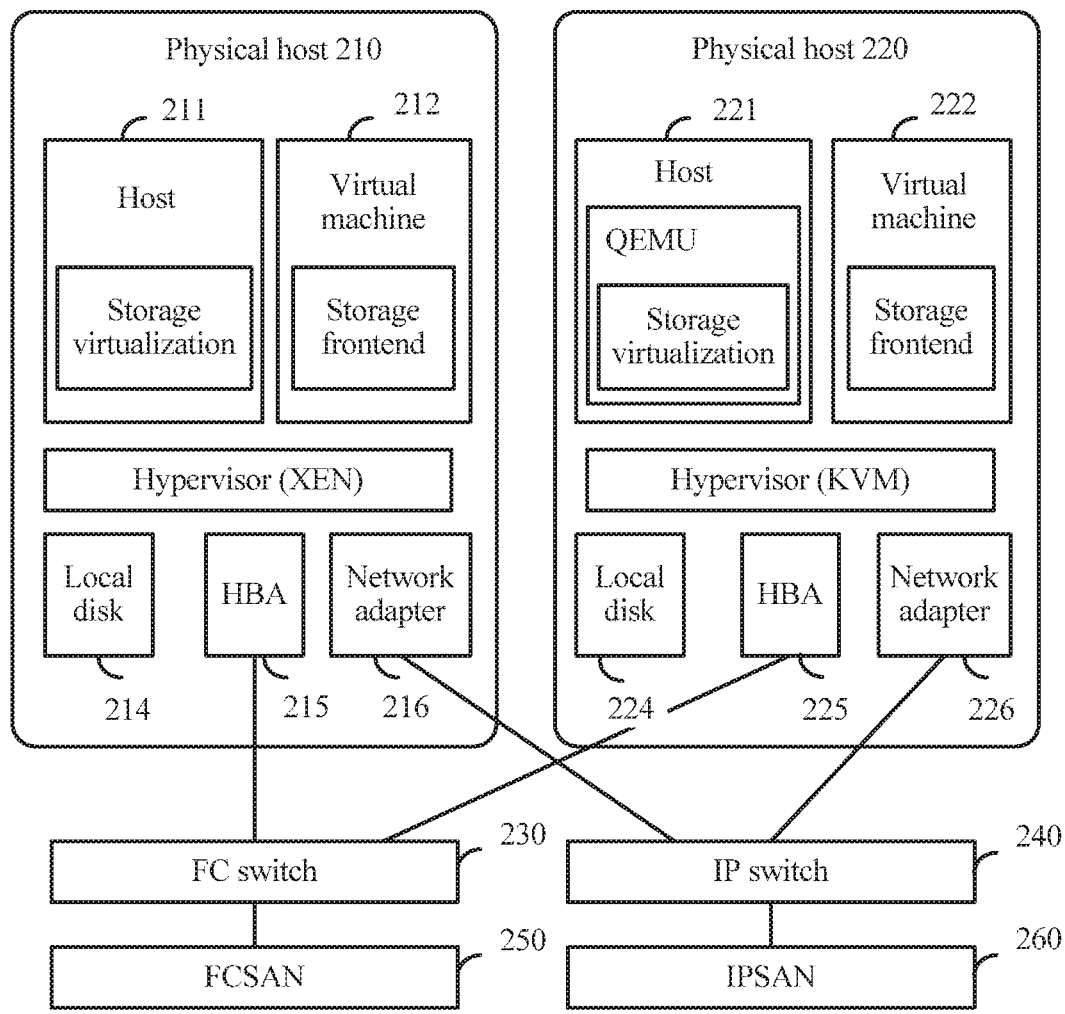
FIG. 2 is a schematic diagram of an architecture of a system to which a read/write path determining method is applicable according to an embodiment of the present disclosure.

FIG. 2 is a schematic diagram of an architecture of a system to which a read/write path determining method is applicable according to an embodiment of the present disclosure. It should be understood that FIG. 2 is only a diagram of an exemplary description for ease of understanding, and does not limit a composition mode of the system architecture. As shown in FIG. 2, the system architecture may include:

a physical host 210 and/or a physical host 220, where the physical host 210 and/or the physical host 220 may be a physical host, a terminal computer, or the like, which is not limited in the present disclosure;

an FC (fiber channel) switch 230 and/or an IP (Internet Protocol) switch 240; and an FCSAN (fiber channel storage area network) 250 and/or an IPSAN (Internet Protocol storage area network) 260.

The physical host 210 uses an XEN virtualization technology, and the physical host 220 uses a KVM (kernel-based virtual machine) virtualization technology.

The physical host 210 may include: a host operating system (Host OS) 211, one or more virtual machines (VM) 212, a hypervisor 213, a local disk 214, an HBA (Host Bus Adapter) 215, and a network adapter 216.

Figure 1:
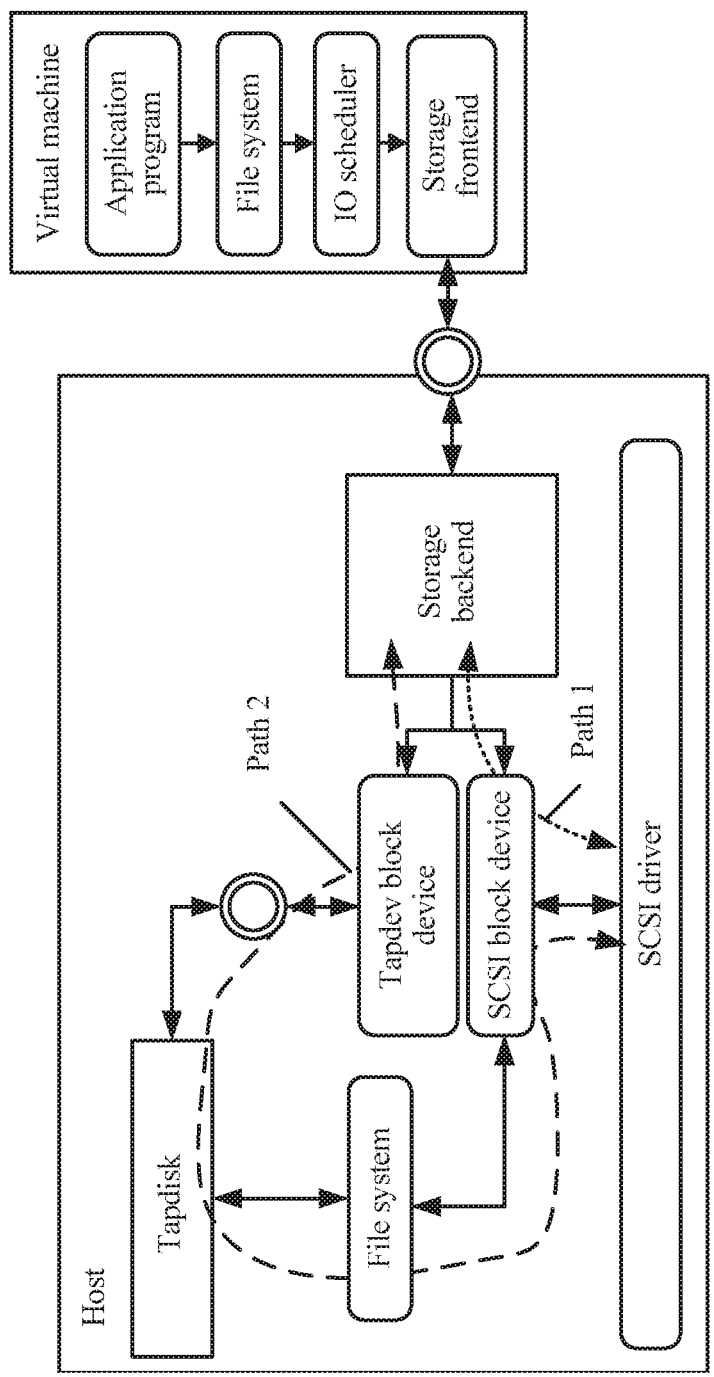
FIG. 1 is a schematic block diagram of a virtual storage device.

The host operating system 211 includes storage virtualization which may include, for example, a driver of a storage backend, a virtual disk, a file system, and a block device, which are shown in FIG. 1.

A database, an office desktop application, and the like may run on the virtual machine 212. The virtual machine 212 may include a storage frontend, and the storage frontend is a disk drive in the virtual machine and may interact with the storage virtualization in the host operating system so as to transfer data in the virtual machine to the host operating system.

The hypervisor is configured to simulate the physical host.

The HBA 215 is similar to the network adapter 216, and the physical host 210 connects to a switch or a storage device by using the HBA or the network adapter 214.

As shown in FIG. 2, the physical host 220 is similar to the physical host 210, and modules in the physical host 220 are respectively corresponding to the modules in the physical host 210, and are not described herein.

The FC switch 230 and the IP switch 240 are configured to forward, to a corresponding SAN side, data output by the physical host 210 and the physical host 220.

The FCSAN 250 connects to an HBA/network adapter, a switch, and/or a storage array by using a fiber optic network. The IPSAN 260 connects to an HBA/network adapter, a switch, and/or a storage array by using an IP network.

It should be understood that FIG. 2 is an exemplary description of the system to which the read/write path determining method is applicable according to this embodiment of the present disclosure. The physical host 210 and the physical host 220 that are shown in the figure are used as an example to describe a virtualization technology type of a physical host that may be supported in the system, and a type of the physical host that may be supported in the system is not limited thereto. The FC switch 230 and the IP switch 240 that are shown in the figure indicate a type of a switch that may be supported in the system, and the type of the switch that may be supported in the system is not limited thereto. Actually, the system may include one or more physical hosts of a same technology type or different technology types, and may include one or more switches of a same type or different types, which is not limited in this embodiment of the present disclosure.

All physical hosts in the system shown in FIG. 2 support the read/write path determining method described in this embodiment of the present disclosure, and processes in which a read/write request is processed by using a path 1 and a path 2 in the prior art. FIG. 1 may be understood as a schematic diagram of a process in which a physical host in the system shown in FIG. 2 processes a read/write request by using the path 1 and the path 2 in the prior art.

With reference to FIG. 1 and FIG. 2, the following briefly describes the process in which the read/write request is processed by using the path 1 and the path 2 in the prior art.

When a read/write request is processed by using the path 2, a storage backend sends the read/write request to a tapdev block device. The tapdev block device is created when the virtual machine is started. After receiving the read/write request, the tapdev block device places the read/write request into an IO ring of a memory shared by a tapdisk in a user mode and a tapdev; and then the tapdisk process is woken up. After the tapdisk is woken up, a data read/write request in the IO ring is fetched, and then the data read/write request is sent to a corresponding disk image file driver. After being processed by the disk image file driver according to a disk format, the read/write request is converted into a read/write operation on a file. Then, a read/write interface of a file system is invoked to perform data reading/writing. After the file system receives the read/write request, the read/write request is converted into block device reading/writing by using file system metadata, and then is sent to a SCSI driver. If a physical address corresponding to the read/write request is not located in the local disk, the read/write request arrives at the SAN side by means of the HBA or the network adapter, and a corresponding target storage array in the IPSAN or the FCSAN performs a read/write operation. Alternatively, if a physical address corresponding to the read/write request is located in the local disk, the local disk is invoked to directly perform a read/write operation corresponding to the read/write request.

When a read/write request is processed by using the path 1, a storage backend sends the data read/write request directly to a preset SCSI block device, and the read/write request is subsequently processed by using a SCSI driver layer. If a physical address corresponding to the read/write request is not located in the local disk, the read/write request arrives at the SAN side by means of the HBA or the network adapter, and a corresponding target storage array in the IPSAN or the FCSAN performs a read/write operation. Alternatively, if a physical address corresponding to the read/write request is located in the local disk, the local disk is invoked to directly perform a read/write operation corresponding to the read/write request.

Figure 3:
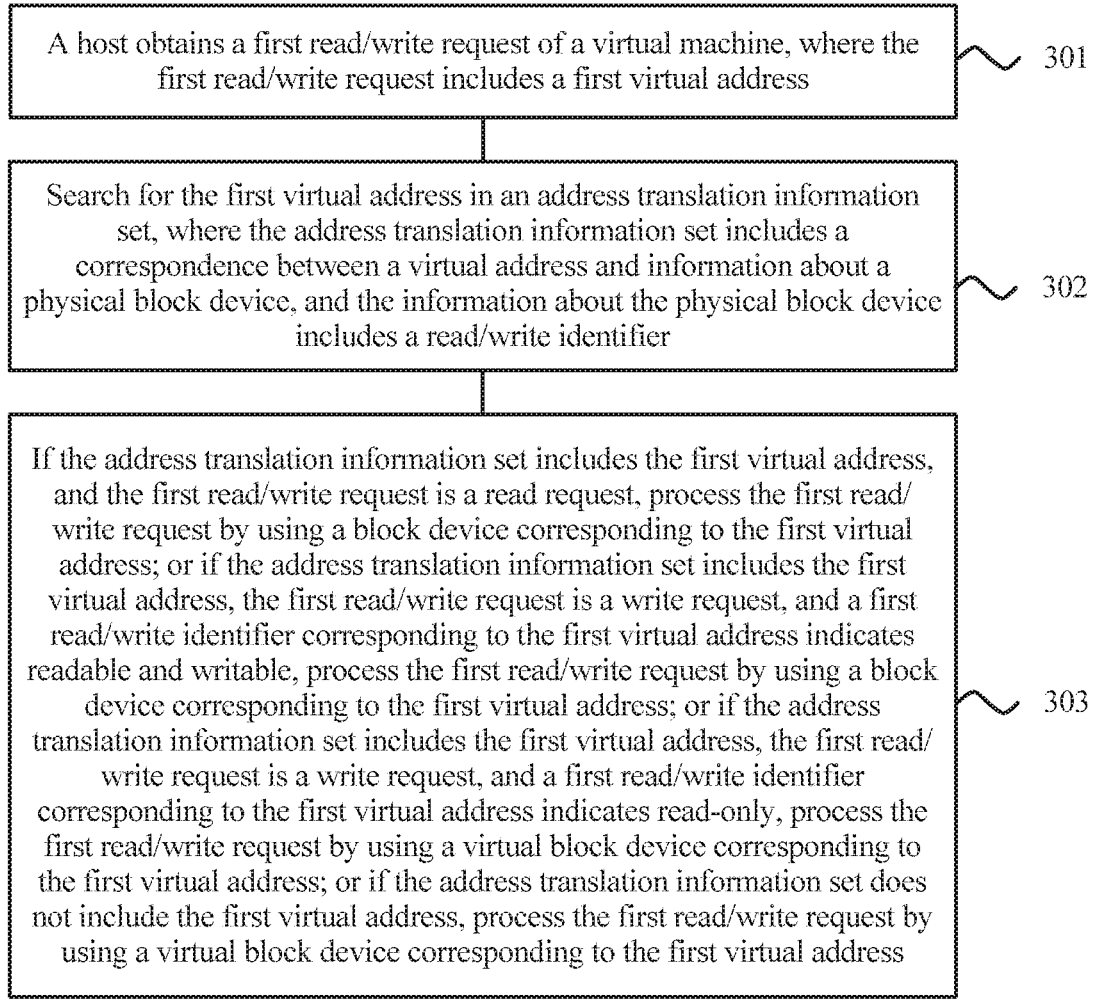
FIG. 3 is a schematic flowchart of a read/write path determining method according to an embodiment of the present disclosure.

FIG. 3 is a schematic flowchart of a read/write path determining method 300 according to an embodiment of the present disclosure. The method in FIG. 3 may be used by a physical host. The physical host includes a hardware layer, a host (Host) running on the hardware layer, and a virtual machine running on the host. The host includes a block device and a virtual block device. As shown in FIG. 3, the method 300 may include the following content.

301. The host obtains a first read/write request of the virtual machine, where the first read/write request includes a first virtual address.

For example, a storage backend in the host obtains the first read/write request from an IO ring shared by the storage backend and a storage frontend (Storage frontend). The first read/write request may further include a read/write type and read/write content. The first read/write request is any read/write request of the virtual machine.

The first virtual address may be a logical block address (LBA), or may be an address indicated in another addressing manner, which is not limited in this embodiment of the present disclosure.

The first virtual address may be one address or multiple addresses. An address in this embodiment of the present disclosure may be indicated by using a start address and an address length.

302. Search for the first virtual address in an address translation information set, where the address translation information set includes a correspondence between a virtual address and information about a physical block device, and the information about the physical block device includes a read/write identifier.

The information about the physical block device may further include a physical block device identifier and a physical address. The address translation information set may be stored in a form of a table, a tree, or the like. A form in which the address translation information set is stored is not limited in this embodiment of the present disclosure.

Specifically, the address translation information set may be stored in the storage backend of the host, and step 302 may be executed by the storage backend.

303. If the address translation information set includes the first virtual address, and the first read/write request is a read request, process the first read/write request by using a block device corresponding to the first virtual address; or if the address translation information set includes the first virtual address, the first read/write request is a write request, and a first read/write identifier corresponding to the first virtual address indicates readable and writable, process the first read/write request by using a block device corresponding to the first virtual address; or if the address translation information set includes the first virtual address, the first read/write request is a write request, and a first read/write identifier corresponding to the first virtual address indicates read-only, process the first read/write request by using a virtual block device corresponding to the first virtual address; or if the address translation information set does not include the first virtual address, process the first read/write request by using a virtual block device corresponding to the first virtual address.

The host may include multiple block devices and multiple virtual block devices. There is a correspondence between a block device and a physical block device that is on a hardware layer and that is allocated to a virtual disk, and there is a correspondence between a virtual block device and a virtual disk in a virtual machine.

It should be understood that a physical block device identifier corresponding to a virtual address in a read/write request may be determined by searching the address translation information set, and a correspondence between a physical block device on a hardware layer and a block device in a host is recorded in the host, so that a block device corresponding to the virtual address in the read/write request can be determined.

The block device may correspond to a SCSI block device shown in FIG. 1. When the read/write request is processed by using the block device, a read/write path for the read/write request is a path 1 in FIG. 1, that is, a short path. It should be further understood that the SCSI block device shown in FIG. 1 is only an example of the block device. The SCSI block device may also be replaced with another block device, which is not limited in this embodiment of the present disclosure. For example, the block device may also be an ATA/IDE (advanced technology attachment/integrated drive electronics) block device, an FC block device, an SATA (serial advanced technology attachment) block device, an SAS (serial attached SCSI) block device, or the like.

It should be understood that there is a correspondence between a virtual disk in a virtual machine and a virtual block device in a host, and a corresponding virtual block device can be determined according to the virtual address in the read/write request.

The virtual block device may correspond to a tapdev block device during XEN virtualization shown in FIG. 1. When the read/write request is processed by using the virtual block device, a read/write path for the read/write request is a path 2 shown in FIG. 1, that is, a long path. The virtual block device in this embodiment of the present disclosure may also correspond to a QEMU (Quick Emulator) during KVM virtualization. It should be understood that there is a correspondence between a virtual disk in a virtual machine and a virtual block device in a host, and a corresponding virtual block device can be determined according to the virtual address in the read/write request. It should be noted that the virtual block device is a block device of a virtual machine, and there is no actual physical block device or physical disk corresponding to the virtual block device. For example, during the XEN virtualization, the tapdev virtual block device is used to forward data (such as the read/write request) to a tapdisk process in a user mode.

Therefore, according to the read/write path determining method in this embodiment of the present disclosure, an appropriate read/write path is determined according to a virtual address in a read/write request and an address translation information set, so that both storage performance and a storage function can be considered.

When a physical address corresponding to the first read/write request is located in a local disk, the first read/write request is processed by using the block device or the virtual block device, and a read/write operation corresponding to the first read/write request may be completed on a target physical disk on the hardware layer of the physical host. When a physical address corresponding to the first read/write request is located at an SAN side, the first read/write request is processed by using the block device or the virtual block device, and a read/write operation corresponding to the first read/write request may be completed on a target physical disk in an SAN.

The first read/write request may be obtained directly from the IO ring, or may be obtained by splitting a read/write request obtained from the IO ring.

Optionally, 301 may include: obtaining a second read/write request of the virtual machine from the input output IO ring shared by the storage frontend and the storage backend, where the second read/write request includes a second virtual address; and splitting the first read/write request off from the second read/write request, where the first virtual address is a partial virtual address in the second virtual address.

For example, when only a partial virtual address in a virtual address in a read/write request obtained by the storage backend is recorded in the address translation information set, the read/write request obtained by the storage backend may be split into two read/write requests for separate processing. A virtual address in one read/write request is recorded in the address translation information set, and a virtual address in the other read/write request is not recorded in the address translation information set. For example, if the virtual address in the read/write request obtained from the IO ring by the storage backend is 1-100, but only a part 1-70 of the virtual address is recorded in the address translation information set, the read/write request may be split into two read/write requests. A virtual address in one read/write request is 1-70, and a virtual address in the other read/write request is 71-100. Then, the two read/write requests obtained by means of splitting are separately processed. It should be understood that in a process of splitting the read/write request, read/write content further needs to be correspondingly split according to a split condition of the virtual address.

Specifically, the information about the physical block device further includes the physical block device identifier and the physical address. The processing the first read/write request by using a block device in 303 includes: translating the first read/write request into a block device read/write request, where the block device read/write request includes a first physical address and a first physical block device identifier that are corresponding to the first virtual address; and processing the block device read/write request by using the block device corresponding to the first virtual address.

Optionally, when the address translation information set includes the first virtual address, the first read/write request is a write request, and the first read/write identifier corresponding to the first virtual address indicates read-only, the method 300 may further include: deleting an initial record corresponding to the first virtual address from the address translation information set. It should be noted that the initial record corresponding to the first virtual address refers to an initial record corresponding to a first virtual address in an address translation information set that is set during host initialization or loaded during initialization.

Further, because the read/write identifier corresponding to the first virtual address in the address translation information set indicates read-only, the write operation cannot be performed, and therefore a record corresponding to the first virtual address in the address translation information set needs to be deleted. A tapdisk process or a QEMU, and the file system that are in the host reallocate a block for the first virtual address according to the first read/write request.

For example, when the virtual disk in the virtual machine is a differential mirror virtual disk, a physical block corresponding to a child image file can be read and written, and a physical block corresponding to a parent image file can be read only. When a read/write identifier of a physical address corresponding to a virtual address in a read/write request indicates read-only, the virtual address in the read/write request corresponds to a parent image file, a record corresponding to the parent image file needs to be deleted from an address translation table, and a record corresponding to a child image file is in the address translation table.

Optionally, if the address translation information set does not include the first virtual address, or if the address translation information set includes the first virtual address, the first read/write request is a write request, and the first read/write identifier corresponding to the first virtual address indicates read-only, the method 300 may further include:

obtaining, according to the first read/write request, a first physical address, a first physical block device identifier, and a first read/write identifier that are corresponding to the first virtual address; and adding, into the address translation information set, a correspondence between the obtained first virtual address and each of the obtained first physical address, the obtained first physical block device identifier, and the obtained first read/write identifier.

For example, in a process of processing the first read/write request, the tapdisk process during the XEN virtualization or the QEMU during the KVM virtualization may further send, to the storage backend, the correspondence between the first virtual address and each of the first physical address, the first physical block device identifier, and the first read/write identifier after a physical block is reallocated for the first virtual address in the first read/write request, so that the storage backend updates the address translation information set in time.

The tapdisk process during the XEN virtualization or the QEMU during the KVM virtualization may obtain information about a physical block device corresponding to a virtual address.

If the virtual disk is a thick-provisioned virtual disk, because entire disk space of the thick-provisioned virtual disk is allocated and occupied when an image file is created, the address translation information set includes a correspondence between a whole virtual address in the virtual disk and each of a physical address and a physical block device, and the address translation information set does not need to be reset subsequently.

If the virtual disk in the virtual machine is a thin-provisioned virtual disk and a differential mirror virtual disk, the address translation information set includes a correspondence between a partial virtual address and each of a physical address and a physical block device. If the address translation information set does not include the virtual address in the read/write request, the read/write request is sent to a virtual block device corresponding to the long path. In the long path, a physical block may be allocated for the virtual address, and the correspondence between the virtual address and each of the physical address, the physical block device identifier, and the read/write identifier are set into the address translation information set of the storage backend. Records included in the address translation information set are increasing as time goes by, until correspondences of the whole virtual address are included.

Optionally, the method 300 may further include: determining whether to enable an advanced storage service. Correspondingly, the searching for the first virtual address in an address translation information set in step 302 includes:

searching for the first virtual address in the address translation information set if the advanced storage service is not enabled.

In this embodiment of the present disclosure, before determining that the advanced storage service is not enabled, the method 300 may further include: obtaining a path switching instruction, where the path switching instruction is used to instruct whether to enable the advanced storage service; and determining, according to the path switching instruction, whether to enable the advanced storage service.

The path switching instruction may be obtained by the tapdisk process during the XEN virtualization, or may be obtained by the QEMU during the KVM virtualization.

For example, when the advanced storage service is enabled, the storage backend may send the obtained read/write request directly to a corresponding virtual block device by using a long path (the path 2 shown in FIG. 1) with an advanced storage feature, and there is no need to search the address translation information set to determine a read/write path for the read/write request. In this case, a virtual machine snapshot, virtual machine storage live migration, virtual machine storage thin provisioning, and the like may be performed.

It should be understood that after the advanced storage service ends, the storage backend obtains a new path switching instruction, and the new path switching instruction indicates that the advanced storage service is not enabled; in this case, the storage backend determines the read/write path for the read/write request according to the address translation information set.

According to the read/write path determining method in this embodiment of the present disclosure, when an advanced storage service is enabled, a read/write request is processed by using a read/write path with an advanced storage feature; or when an advanced storage service is not enabled, a read/write path for a read/write request is determined according to an address translation information set and a virtual address in the read/write request. Both storage performance and a storage function can be considered by processing the read/write request according to different requirements.

Figure 4:
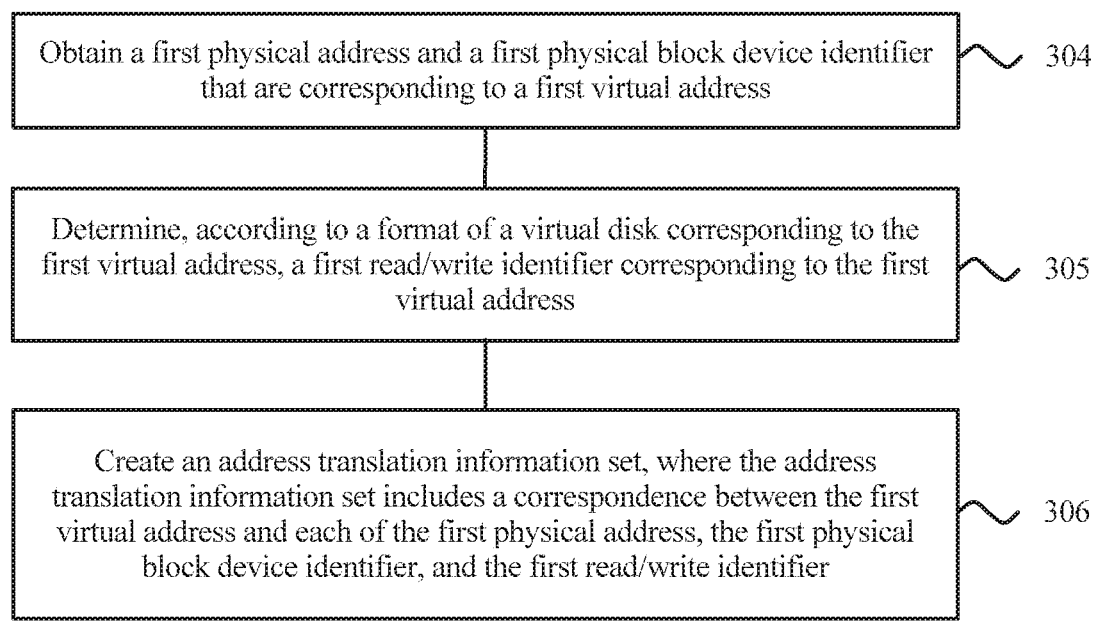
FIG. 4 is a schematic flowchart of a read/write path determining method according to another embodiment of the present disclosure.

Optionally, the information about the physical block device further includes the physical address and the physical block device identifier. When the address translation information set includes the first virtual address, as shown in FIG. 4, before 301, the method 300 may further include the following steps:

304. Obtain a first physical address and a first physical block device identifier that are corresponding to the first virtual address.

305. Determine, according to a format of a virtual disk corresponding to the first virtual address, the first read/write identifier corresponding to the first virtual address.

306. Create the address translation information set, where the address translation information set includes a correspondence between the first virtual address and each of the first physical address, the first physical block device identifier, and the first read/write identifier.

That is, before 301, the host may set the address translation information set during initialization.

304 and 305 may be executed by the tapdisk process during the XEN virtualization or the QEMU during the KVM virtualization, and 306 may be executed by the storage backend.

For example, the tapdisk process during the XEN virtualization or the QEMU during the KVM virtualization may obtain, in a process of starting the virtual machine, a physical address, a physical block device identifier, and a read/write identifier that are corresponding to a virtual address of a virtual disk that is in the virtual machine and to which a physical block has been allocated, and the storage backend creates the address translation information set by means of initialization. The initialized address translation information set may include a correspondence between a virtual address and each of a physical address, a physical block device identifier, and a read/write identifier.

Specifically, content recorded in the address translation information set may be that shown in the following Table 1. For example, the virtual address is indicated by using a virtual start address and an address length, and a flag is a read/write identifier. Because a length of the virtual address is the same as a length of the physical address, only the length of the virtual address needs to be recorded in the address translation information set.

TABLE 1

| Address translation information set | | | | |
| --- | --- | --- | --- | --- |
| Virtual start address | Address length | Physical start address | Physical block device identifier | Flag |
| 1 | 100 | 200 | /dev/sda | Read-only |

Specifically, 305 may include:

if the first virtual address is corresponding to a thick-provisioned virtual disk or a thin-provisioned virtual disk, determining that the first read/write identifier indicates readable and writable;

if the first virtual address is corresponding to a differential mirror virtual disk, and the first virtual address is corresponding to a child image file, determining that the first read/write identifier indicates readable and writable; or if the first virtual address is corresponding to a differential mirror virtual disk, and the first virtual address is corresponding to a parent image file, determining that the first read/write identifier indicates read-only.

Therefore, according to the method for determining a read/write path for a read/write request of a virtual machine in this embodiment of the present disclosure, an appropriate read/write path is determined according to a virtual address in a read/write request and an address translation information set, so that both storage performance and a storage function can be considered.

Figure 5:
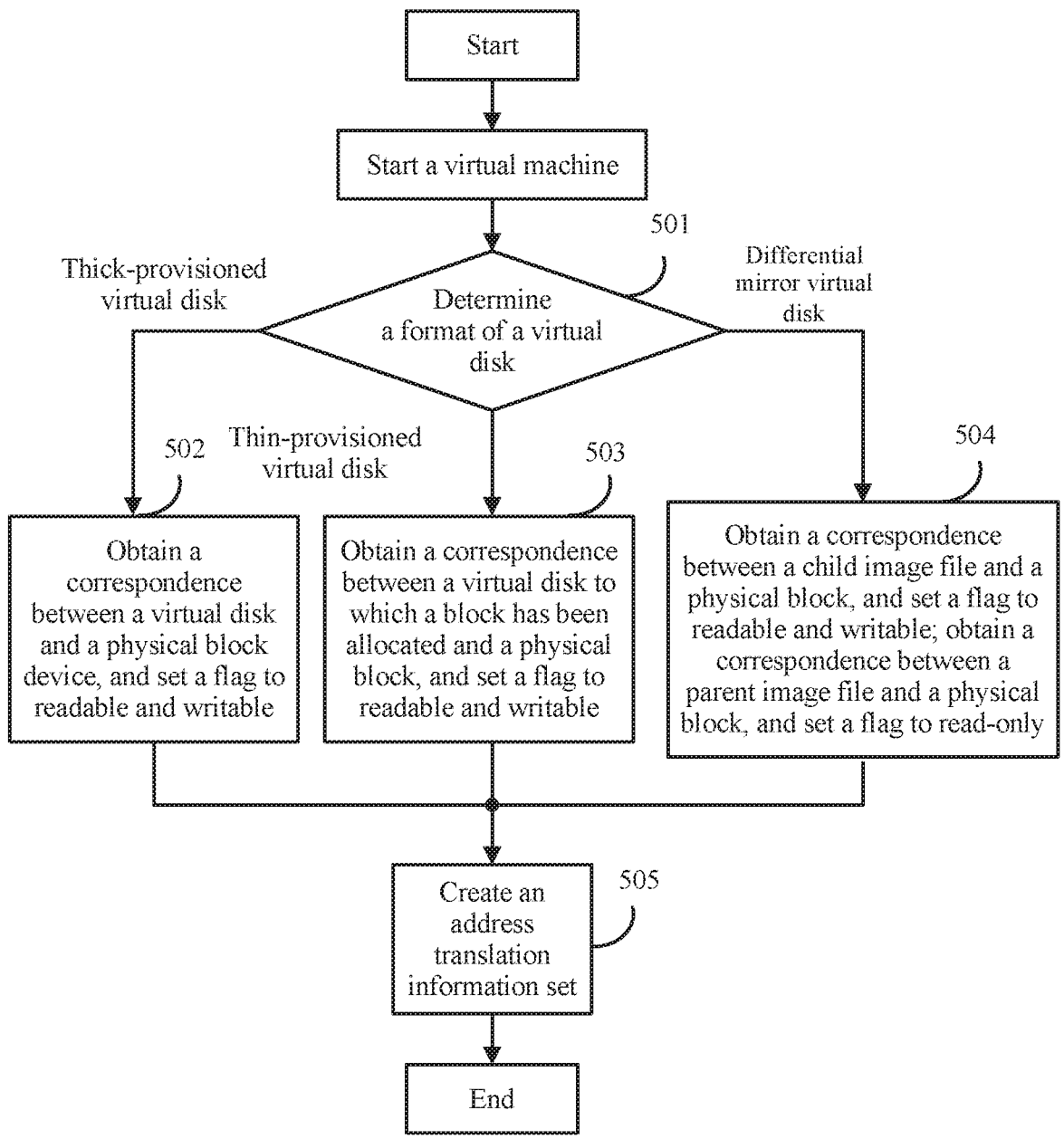
FIG. 5 is a schematic flowchart of initializing an address translation information set according to an embodiment of the present disclosure.

With reference to FIG. 5, the following describes in detail a method for initializing an address translation information set in a read/write path determining method according to an embodiment of the present disclosure. FIG. 5 is a schematic flowchart of initializing an address translation information set.

501. Determine a format of a virtual disk in a virtual machine according to a configuration file of the virtual machine.

502. When the virtual disk in the virtual machine is a thick-provisioned virtual disk, obtain a physical block device identifier and a physical address that are corresponding to a virtual address of the thick-provisioned virtual disk, set a read/write identifier flag to readable and writable, and invoke an interface corresponding to a storage backend so as to send a correspondence between the virtual address and each of the physical address, the physical block device identifier, and the read/write identifier to the storage backend.

503. When the virtual disk in the virtual machine is a thin-provisioned virtual disk, obtain a physical block device identifier and a physical address that are corresponding to a virtual address of the thin-provisioned virtual disk, set a read/write identifier flag to readable and writable, and invoke an interface corresponding to a storage backend so as to send a correspondence between the virtual address and each of the physical address, the physical block device identifier, and the read/write identifier to the storage backend.

504. When a disk in the virtual machine is a differential mirror virtual disk, obtain a physical address and a physical block device identifier that are corresponding to a virtual address of a child image file of the differential mirror virtual disk, and set a read/write identifier corresponding to the child image file to readable and writable; obtain a physical address and a physical block device identifier that are corresponding to a virtual address of a parent image file, and set a read/write identifier corresponding to the parent image file to read-only; and invoke an interface corresponding to a storage backend so as to send correspondences between the virtual addresses of the child image file and the parent image file and each of a physical address, a physical block device identifier, and a read/write identifier to the storage backend.

It should be noted that steps 501 to 504 may be executed by a tapdisk process in the host during XEN virtualization, or may be executed by a QEMU in the host during KVM virtualization.

505. The storage backend obtains the foregoing correspondences and creates an address translation information set.

In this embodiment of the present disclosure, in a process of starting a virtual machine, a storage backend can set an address translation information set by means of initialization, so that a read/write path for a read/write request can be determined according to the address translation information set, and therefore both storage performance and a storage function can be considered.

The following uses XEN virtualization as an example to describe the read/write path determining method 300 according to the embodiment of the present disclosure. A read/write path determining method during KVM virtualization is similar to a read/write path determining method during the XEN virtualization, and is not described herein. It should be understood that a tapdev block device and a tapdisk process during the XEN virtualization may correspond to a QEMU during the KVM virtualization.

Figure 6:
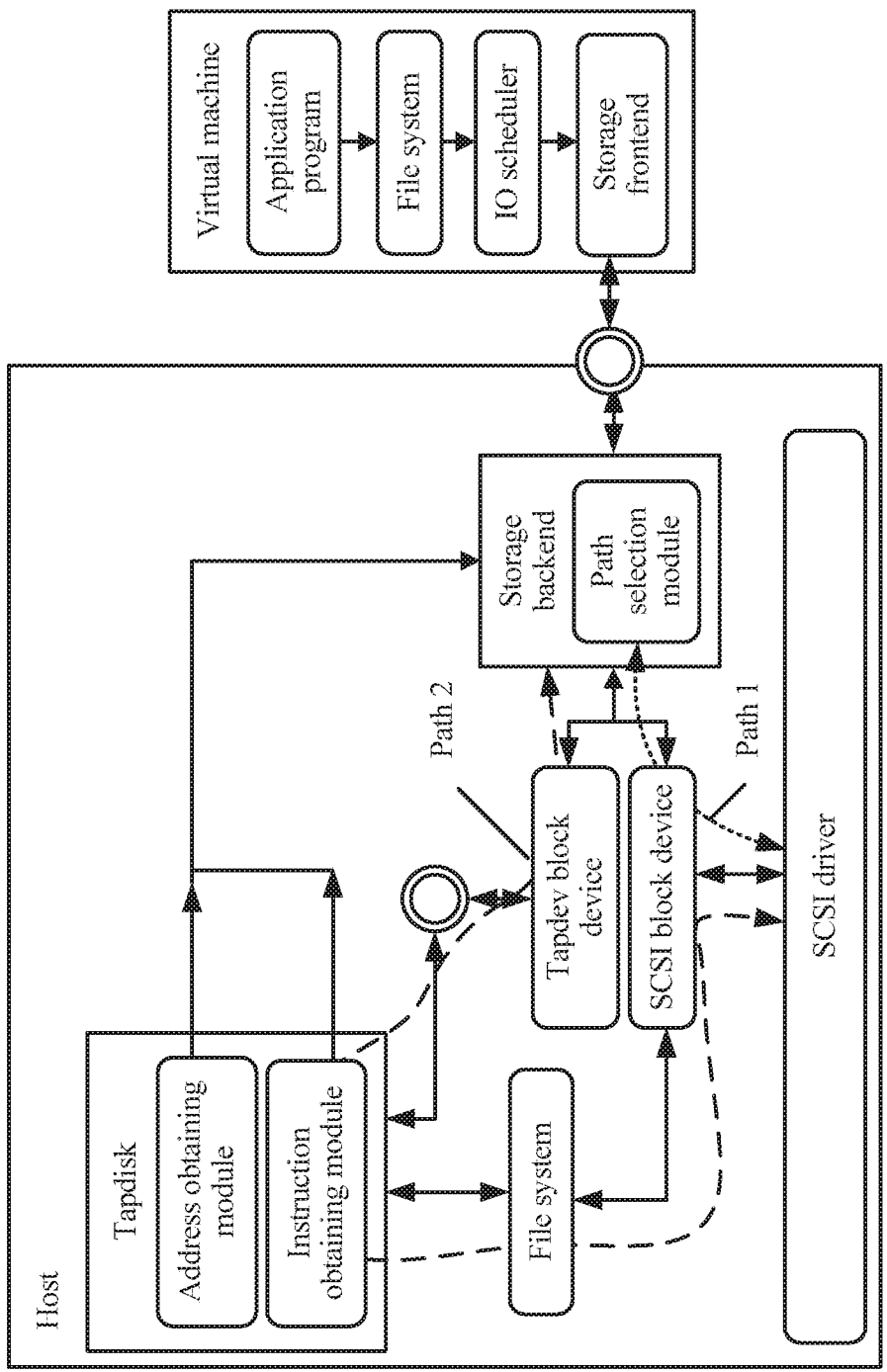
FIG. 6 is a schematic block diagram of a read/write path determining apparatus according to an embodiment of the present disclosure.
Figure 7:
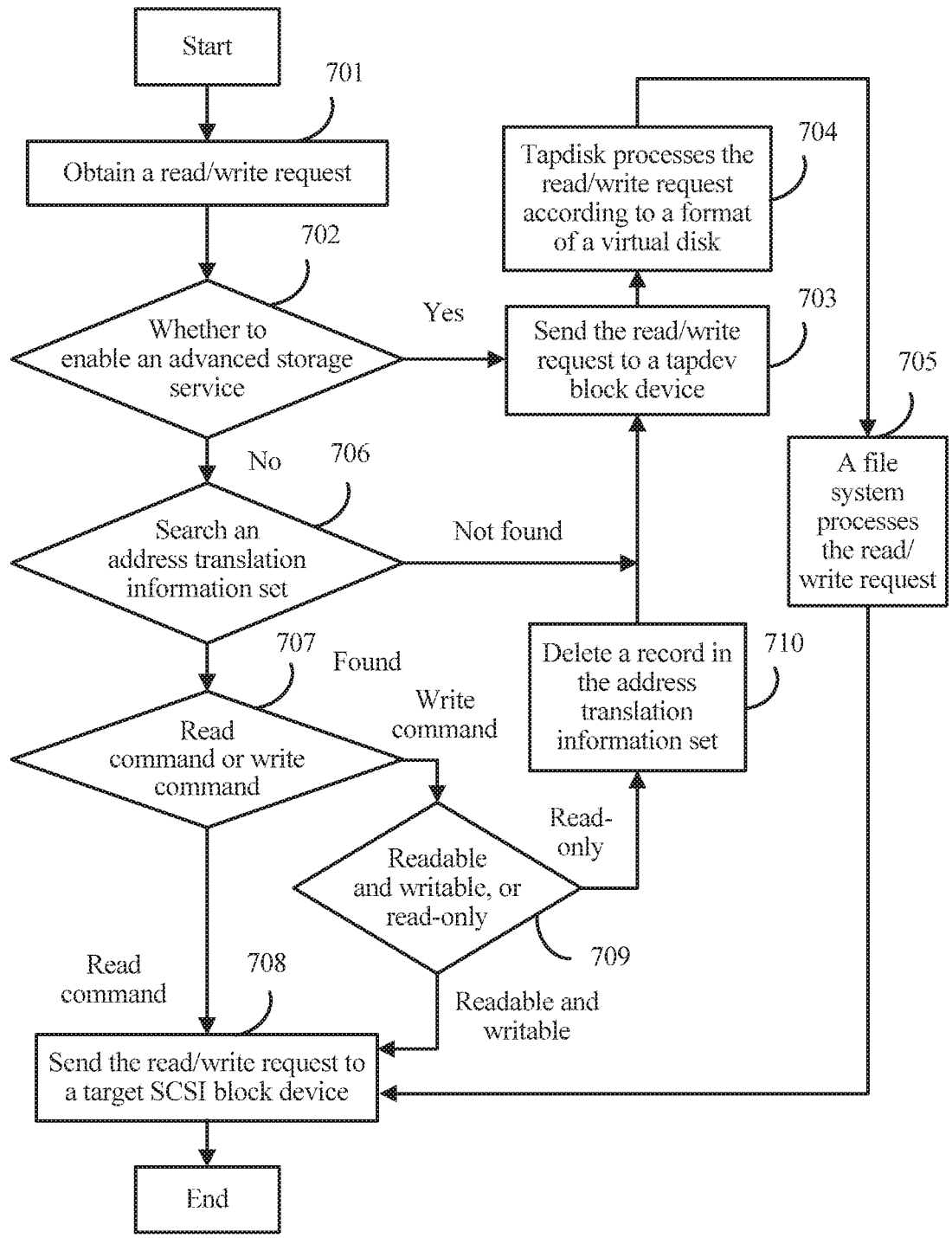
FIG. 7 is a schematic flowchart of a read/write path determining method according to another embodiment of the present disclosure.

With reference to FIG. 6 and FIG. 7, the following describes in detail a read/write path determining method according to an embodiment of the present disclosure. FIG. 6 is a schematic block diagram of a read/write path determining device according to an embodiment of the present disclosure. FIG. 7 is a schematic flowchart of a read/write path determining method according to an embodiment of the present disclosure.

It should be understood that a tapdisk process shown in FIG. 6 may also be a tapdisk2 process, which is not limited in the present disclosure.

It should be understood that in a process of starting a virtual machine, a host operating system creates the tapdisk process and creates a tapdev block device. In a process of starting the tapdisk process, an image file is opened. In a process of opening the image file, in the tapdisk process, a file system interface is invoked to obtain a physical block device identifier, a physical address, and a read/write identifier that are corresponding to a virtual address of a virtual disk that is in the virtual machine and to which a physical block has been allocated; then, an interface corresponding to a storage backend is invoked, so that the storage backend sets the physical block device identifier, the physical address, and the read/write identifier into an address translation information set to complete setting of the address translation information set by means of initialization. The initialized address translation information set may include a correspondence between the virtual address and each of the physical address, the physical block device identifier, and the read/write identifier. Specifically, an address obtaining module may be disposed in the tapdisk process, and the address obtaining module obtains the physical block device identifier, the physical address, and the read/write identifier that are corresponding to the virtual address of the virtual disk that is in the virtual machine and to which the physical block has been allocated.

701. A storage backend obtains a read/write request. Specifically, when an application program in a virtual machine sends the read/write request, the read/write request arrives at a driver of a storage frontend by means of a file system in the virtual machine, and the driver of the storage frontend places the read/write request into an IO ring shared by the storage frontend and the storage backend; and the IO ring notifies the storage backend by using an interruption, and the storage backend reads the read/write request from the IO ring.

702. The storage backend determines whether to enable an advanced storage service, and if the advanced storage service is enabled, execute 703; or if the advanced storage service is not enabled, execute 706.

Specifically, in the tapdisk process, an instruction obtaining module obtains a path switching instruction, and the storage backend determines, according to the path switching instruction, whether to enable the advanced storage service.

If the advanced storage service is enabled, for example, when storage live migration is enabled, a path switching module is invoked in the tapdisk process to notify the storage backend, and a subsequent read/write request needs to be processed by using a long path 2 of the advanced storage service regardless of whether the read/write request exists in the address translation information set. After the advanced storage service ends, the path switching module is invoked in the tapdisk process to instruct the storage backend to recover to a normal state.

703. The storage backend sends the read/write request to a tapdev block device.

The tapdev block device places the read/write request into an IO ring of a memory shared by the tapdisk process in a user mode and the tapdev, and then the tapdisk process is woken up.

704. After the tapdisk process is woken up, fetch the read/write request from the IO ring, and invoke a corresponding driver according to a format of a disk image file in the virtual machine. After a corresponding disk image file diver processes the read/write request according to a disk format, convert the read/write request into a read/write request for an image file. Then, execute 705.

705. After the file system receives the read/write request for the file, convert the read/write request into a block device read/write request for a block device; in this case, the block device read/write request includes a physical address, a physical block device identifier, read/write content, and a read/write type. Then, execute 708.

In addition, after the tapdisk process and the file system complete processing of the read/write request, the address translation information set may be reset.

For example, if the read/write request needs a newly-allocated block, the tapdisk process obtains a physical address and a physical block device identifier that are corresponding to a newly-allocated physical block, and determines a read/write identifier according to a format of a virtual disk. Then, the storage backend updates the address translation information set.

Alternatively, if the virtual disk is a differential mirror virtual disk, for example, the virtual disk is corresponding to a disk image file in a diff format, and the read/write request is a write request, a record corresponding to a parent image file needs to be first deleted from the address translation information set of the storage backend, and a record corresponding to a child image file is in the address translation information set.

In addition, in a process of performing the advanced storage service, a virtual address of the virtual machine may be changed. For example, in a process of performing storage live migration, a virtual address and a corresponding physical block of a virtual machine in which target storage or source storage is located have changed, and an interface of the storage backend needs to be invoked to delete an original address translation information set and create a new address translation information set.

706. The storage backend searches an address translation information set according to a virtual address in the read/write request; and if the virtual address is not in the address translation information set, execute 703; or if the virtual address is in the address translation information set, execute 707.

If only a partial address in the virtual address in the read/write request is recorded in the address translation information set, the read/write request may be split into two read/write sub-requests. For a read/write sub-request corresponding to a partial virtual address recorded in the address translation information set, 707 is executed; for a read/write sub-request corresponding to a virtual address not recorded in the address translation information set, 703 is executed.

707. The storage backend determines whether the read/write request is a read request or a write request; and if the read/write request is a read request, convert the request into a block device read request, and continue to execute 708; or if the read/write request is a write request, continue to execute 709.

708. Send the read/write request to a SCSI block device.

It should be understood that the SCSI block device is only used as an example for description in FIG. 7. The SCSI block device described in the embodiment shown in FIG. 3 may also be replaced with another block device, which is not described herein.

Specifically, a block device read/write request may be sent to the SCSI block device, and the block device read/write request carries the read/write type, the read/write content, the physical address, and the physical block device identifier. There is a correspondence between the physical block device and a SCSI block device in FIG. 6.

709. The storage backend further determines a read/write type of a read/write identifier flag corresponding to the virtual address in the write request in the address translation information set; and if the flag indicates readable and writable, continue to execute 708; or if the flag indicates read-only, continue to execute 710.

It should be understood that if the flag indicates read-only, the virtual disk is a differential mirror virtual disk, and the virtual address in the write request is corresponding to a parent image file in the differential mirror virtual disk.

710. Delete a record of the virtual address from the address translation information set, and continue to execute 703.

Specifically, a record corresponding to a source LBA may be directly deleted from the address translation information set, or a corresponding record may be deleted by splitting a record in the address translation information set. For example, the write request received by the storage backend has a virtual start address of 50 and an address length of 20, but in the address translation information set, it is recorded that a virtual start address is 1, an address length is 100, and the flag indicates read-only (as shown in Table 1). In this case, the storage backend needs to delete a record corresponding to the virtual start address in the write request, and the record shown in Table 1 may be split into records shown in the following Table 2.

TABLE 2

| Address translation information set | | | | |
|---|---|---|---|---|
| Virtual start address | Address length | Physical start address | Physical block device identifier | Flag |
| 1 | 49 | 200 | /dev/sda | Read-only |
| 71 | 30 | 271 | /dev/sda | Read-only |

After step 704, the storage backend may obtain, from the tapdisk process, a correspondence between a virtual address of a write request and each of a physical address, a physical block device identifier, and a read/write identifier, and update the address translation information set. The updated address translation information set may be that shown in the following Table 3.

TABLE 3

| Address translation information set | | | | |
|---|---|---|---|---|
| Virtual start address | Address length | Physical start address | Physical block device identifier | Flag |
| 1 | 49 | 200 | /dev/sda | Read-only |
| 71 | 30 | 271 | /dev/sda | Read-only |
| 50 | 20 | 250 | /dev/sda | Readable and writable |

Figure 9:
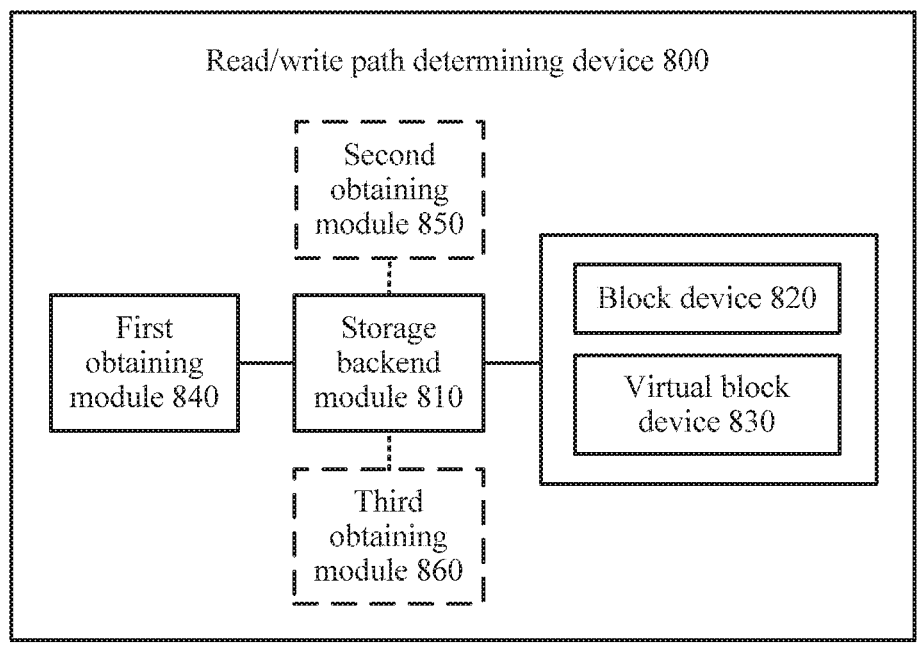
FIG. 9 is a schematic block diagram of a read/write path determining apparatus according to another embodiment of the present disclosure.

Specifically, as shown in FIG. 9, a path selection module may be disposed in the storage backend, and steps 702, 705, 706, and 709 may be specifically executed by the path selection module.

Therefore, according to the read/write path determining method in this embodiment of the present disclosure, an appropriate read/write path is determined according to a virtual address in a read/write request and an address translation information set, so that both storage performance and a storage function can be considered.

The foregoing describes in detail the read/write path determining method according to the embodiment of the present disclosure with reference to FIG. 3 to FIG. 7. The following describes in detail a read/write path determining device according to an embodiment of the present disclosure with reference to FIG. 8 to FIG. 10.

Figure 8:
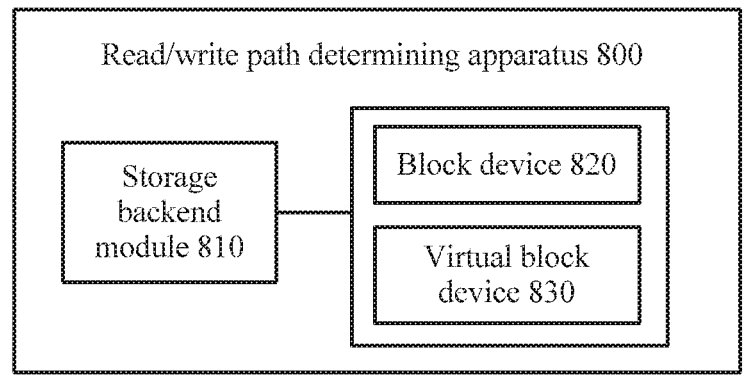
FIG. 8 is a schematic block diagram of a read/write path determining apparatus according to an embodiment of the present disclosure.

FIG. 8 is a schematic block diagram of a read/write path determining apparatus 800 according to an embodiment of the present disclosure. The apparatus 800 is applied to a physical host, and a virtual machine runs on the physical host. As shown in FIG. 8, the apparatus 800 includes: a storage backend module 810, a block device 820, and a virtual block device 830.

The storage backend module 810 is configured to: obtain a first read/write request of the virtual machine, where the first read/write request includes a first virtual address; and search for the first virtual address in an address translation information set, where the address translation information set includes a correspondence between a virtual address and information about a physical block device, and the information about the physical block device includes a read/write identifier.

The information about the physical block device may further include a physical address and a physical block device identifier.

The block device 820 is configured to: process the first read/write request if the address translation information set includes the first virtual address, and the first read/write request is a read request; or process the first read/write request if the address translation information set includes the first virtual address, the first read/write request is a write request, and a first read/write identifier corresponding to the first virtual address indicates readable and writable.

The virtual block device 830 is configured to: process the first read/write request if the address translation information set includes the first virtual address, the first read/write request is a write request, and a first read/write identifier corresponding to the first virtual address indicates read-only; or process the first read/write request if the address translation information set does not include the first virtual address.

The apparatus 800 may include multiple block devices and virtual block devices.

When the address translation information set includes the first virtual address, a physical block device that is on a hardware layer and that is corresponding to the first virtual address can be determined. The block device 820 is a block device corresponding to the physical block device corresponding to the first virtual address.

The virtual block device 830 is a virtual block device corresponding to a virtual disk in which the first virtual address is located.

Therefore, according to the read/write path determining device in this embodiment of the present disclosure, an appropriate read/write path is determined according to a virtual address in a read/write request and an address translation information set, so that both storage performance and a storage function can be considered.

Optionally, the storage backend module 810 may be specifically configured to: obtain a second read/write request of the virtual machine from an input output IO ring shared by a storage frontend and a storage backend, where the second read/write request includes a second virtual address; and split the first read/write request off from the second read/write request, where the first virtual address is a partial virtual address in the second virtual address.

The information about the physical block device may further include the physical block device identifier and the physical address. The storage backend module 810 may be specifically configured to translate the first read/write request into a block device read/write request, where the block device read/write request includes a first physical address and a first physical block device identifier that are corresponding to the first virtual address. The block device 820 is specifically configured to process the block device read/write request.

The storage backend module 810 may be further configured to: when the address translation information set includes the first virtual address, the first read/write request is a write request, and the read/write identifier corresponding to the first virtual address in the address translation information set indicates read-only, delete an initial record corresponding to the first virtual address from the address translation information set.

Optionally, as shown in FIG. 9, the apparatus 800 may further include: a first obtaining module 840, configured to: if the address translation information set does not include the first virtual address, or if the address translation information set includes the first virtual address, the first read/write request is a write request, and the first read/write identifier corresponding to the first virtual address indicates read-only, obtain, according to the first read/write request, a first physical address, a first physical block device identifier, and a first read/write identifier that are corresponding to the first virtual address. The storage backend module 810 is further configured to add, into the address translation information set, a correspondence between the first virtual address and each of the first physical address, the first physical block device identifier, and the first read/write identifier.

Optionally, the storage backend module 810 may be specifically configured to: determine whether to enable an advanced storage service, and search for the first virtual address in the address translation information set if the advanced storage service is not enabled.

Specifically, the apparatus 800 may further include: a second obtaining module 850, configured to obtain a path switching instruction, where the path switching instruction is used to instruct whether to enable the advanced storage service. The storage backend module 810 is specifically configured to determine, according to the path switching instruction, whether to enable the advanced storage service.

Optionally, the information about the physical block device may further include the physical address and the physical block device identifier. The apparatus 800 further includes: a third obtaining module 860, configured to: when the address translation information set includes the first virtual address, before the storage backend module 810 obtains the first read/write request, obtain the first physical address and the first physical block device identifier that are corresponding to the first virtual address; and determine, according to a format of a virtual disk corresponding to the first virtual address, the first read/write identifier corresponding to the first virtual address. The storage backend module 810 is further configured to create the address translation information set, where the address translation information set includes a correspondence between the first virtual address and each of the first physical address, the first physical block device identifier, and the first read/write identifier.

The third obtaining module 860 may be specifically configured to:

if the first virtual address is corresponding to a thick-provisioned virtual disk or a thin-provisioned virtual disk, determine that the first read/write identifier indicates readable and writable;

if the first virtual address is corresponding to a differential mirror virtual disk, and the first virtual address is corresponding to a child image file, determine that the first read/write identifier indicates readable and writable; or if the first virtual address is corresponding to a differential mirror virtual disk, and the first virtual address is corresponding to a parent image file, determine that the first read/write identifier indicates read-only.

It should be noted that the third obtaining module 860 and the first obtaining module 840 may be a same module, or may be different modules, which is not limited in this embodiment of the present disclosure. The first obtaining module 840, the second obtaining module 850, and the third obtaining module 860 may be configured to implement a tapdisk process during XEN virtualization or a corresponding function of a QEMU during KVM virtualization. For example, the first obtaining module 840 and the third obtaining module 860 may correspond to an address obtaining module in a tapdisk process shown in FIG. 6; the second obtaining module 850 may correspond to an instruction obtaining module in the tapdisk process shown in FIG. 6.

It should be understood that the read/write path determining apparatus 800 according to this embodiment of the present disclosure may correspond to the read/write path determining method 300 according to the embodiment of the present disclosure, and the foregoing and other operations and/or functions of the modules in the apparatus 800 are respectively used to implement corresponding procedures of the methods shown in FIG. 3 to FIG. 7. For brevity, details are not described herein.

Therefore, according to the read/write path determining device in this embodiment of the present disclosure, an appropriate read/write path is determined according to a virtual address in a read/write request and an address translation information set, so that both storage performance and a storage function can be considered.

With reference to the accompany drawings, the following describes in detail a technical solution in which a storage backend module, a first obtaining module, a second obtaining module, and a third obtaining module may be implemented by a processor by executing a program or an instruction that is in a memory.

Figure 10:
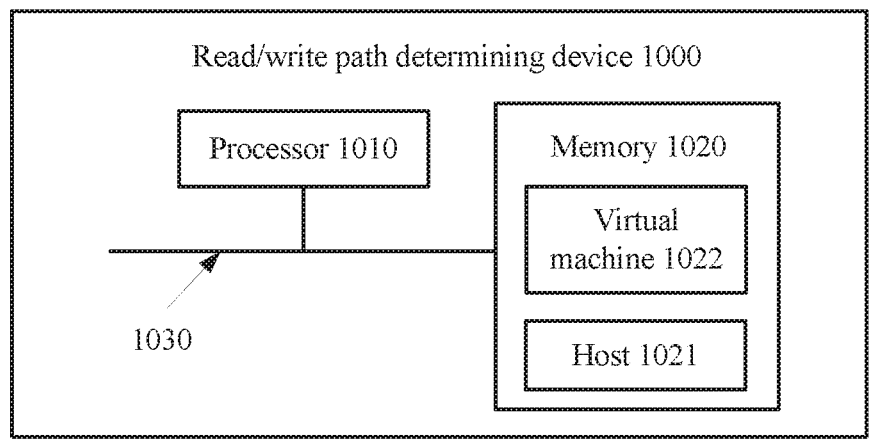
FIG. 10 is a schematic block diagram of a read/write path determining apparatus according to another embodiment of the present disclosure.

FIG. 10 is a schematic block diagram of a read/write path determining apparatus 1000 according to another embodiment of the present disclosure. Specifically, the apparatus 1000 may be applied to a physical host, and a virtual machine runs on the physical host. As shown in FIG. 10, the apparatus 1000 includes: a processor 1010, a memory 1020, and a bus system 1030. The processor 1010 and the memory 1020 are connected by using the bus system 1030. The memory 1020 may include a read-only memory and a random access memory, and provide an instruction and data for the processor 1010. A part of the memory 1020 may further include a non-volatile random access memory (NVRAM). In some implementation manners, the memory 1020 stores the following element: an executable module or a data structure, a subset of an executable module or a data structure, or an extended set of an executable module or a data structure.

Host 1021: As a management layer, the host 1021 is configured to: complete hardware resource management and allocation, present a virtual hardware platform for the virtual machine, and implement scheduling and isolation of the virtual machine. The host may be a virtual machine monitor (VMM). In addition, sometimes the host is constituted by combining the VMM and one privileged virtual machine. The virtual hardware platform provides various hardware resources for all virtual machines running on the virtual hardware platform, for example, provides a virtual processor, a memory, a virtual disk, a virtual network adapter, and the like. The virtual disk may correspond to a file or a logic block device in the host. The virtual machine runs on the virtual hardware platform prepared by the host for the virtual machine, and one or more virtual machines run on the host.

Virtual machine 1022: One or more virtual computers may be simulated on a physical computer by using virtual machine software, and these virtual machines work like a real computer. An operating system and an application program may be installed on the virtual machine, and the virtual machine may further access a network resource. For an application program running on the virtual machine, the application program works like working in a real computer.

In this embodiment of the present disclosure, by invoking an operation instruction stored in the memory 1020 (the operation instruction may be stored in the operating system), the processor 1010 is configured to:

obtain a first read/write request of the virtual machine, where the first read/write request includes a first virtual address;

search for the first virtual address in an address translation information set, where the address translation information set includes a correspondence between a virtual address and information about a physical block device, and the information about the physical block device includes a read/write identifier; and if the address translation information set includes the first virtual address, and the first read/write request is a read request, process the first read/write request by using a block device corresponding to the first virtual address; or if the address translation information set includes the first virtual address, the first read/write request is a write request, and a first read/write identifier corresponding to the first virtual address indicates readable and writable, process the first read/write request by using a block device corresponding to the first virtual address; or if the address translation information set includes the first virtual address, the first read/write request is a write request, and a first read/write identifier corresponding to the first virtual address indicates read-only, process the first read/write request by using a virtual block device corresponding to the first virtual address; or if the address translation information set does not include the first virtual address, process the first read/write request by using a virtual block device corresponding to the first virtual address.

Therefore, according to the read/write path determining device in this embodiment of the present disclosure, an appropriate read/write path is determined according to a virtual address in a read/write request and an address translation information set, so that both storage performance and a storage function can be considered.

The processor 1010 controls an operation of the read/write path determining apparatus 1000, and the processor 1010 may also be referred to as a CPU (Central Processing Unit, central processing unit). The memory 1020 may include the read-only memory and the random access memory, and provide the instruction and the data for the processor 1010. A part of the memory 1020 may further include the non-volatile random access memory (NVRAM). In a specific application, all components of the apparatus 1000 are coupled together by using the bus system 1030. The bus system 1030 may further include a power bus, a control bus, a status signal bus, and the like in addition to a data bus. However, for clarity of description, various buses are marked as the bus system 1030 in the figure.

The methods disclosed in the foregoing embodiments of the present disclosure may be applied to the processor 1010, or implemented by the processor 1010. The processor 1010 may be an integrated circuit chip and has a signal processing capability. In an implementation process, the steps of the foregoing methods may be completed by using an integrated logic circuit of hardware in the processor 1010 or an instruction in a form of software. The foregoing processor 1010 may be a general purpose processor, a digital signal processor (DSP), an application-specific integrated circuit (ASIC), a field-programmable gate array (FPGA) or another programmable logic device, a discrete gate or transistor logic device, or a discrete hardware component. The processor 1010 may implement or execute methods, steps, and logical block diagrams disclosed in the embodiments of the present disclosure. The general purpose processor may be a microprocessor or the processor may be any conventional processor, or the like. Steps of the methods disclosed with reference to the embodiments of the present disclosure may be directly executed and completed by means of a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 1020. The processor 1010 reads information in the memory 1020, and completes the steps of the foregoing methods in combination with hardware of the processor 1010.

Optionally, in another embodiment, the processor 1010 is specifically configured to: obtain a second read/write request of the virtual machine from an input output IO ring shared by a storage frontend and a storage backend, where the second read/write request includes a second virtual address; and split the first read/write request off from the second read/write request, where the first virtual address is a partial virtual address in the second virtual address.

The information about the physical block device may further include a physical block device identifier and a physical address. The processor 1010 may be specifically configured to: translate the first read/write request into a block device read/write request, where the block device read/write request includes a first physical address and a first physical block device identifier that are corresponding to the first virtual address; and process the block device read/write request by using the block device corresponding to the first virtual address.

Optionally, the processor 1010 is further configured to: when the address translation information set includes the first virtual address, the first read/write request is a write request, and the first read/write identifier corresponding to the first virtual address indicates read-only, delete an initial record corresponding to the first virtual address from the address translation information set.

Optionally, the processor 1010 is further configured to: if the address translation information set does not include the first virtual address, or if the address translation information set includes the first virtual address, the first read/write request is a write request, and the first read/write identifier corresponding to the first virtual address indicates read-only, obtain a first physical address, a first physical block device identifier, and a first read/write identifier that are corresponding to the first virtual address; and record, in the address translation information set, a correspondence between the first virtual address and each of the first physical address, the first physical block device identifier, and the first read/write identifier.

Optionally, the processor 1010 is further configured to: before searching for the first virtual address in the address translation information set, determine whether to enable an advanced storage service.

The processor 1010 may be specifically configured to: obtain a path switching instruction, where the path switching instruction is used to instruct whether to enable the advanced storage service; and determine, according to the path switching instruction, whether to enable the advanced storage service.

Optionally, the information about the physical block device further includes the physical address and the physical block device identifier. The processor 1010 is further configured to: if the address translation information set includes the first virtual address, before obtaining the first read/write request, obtain the first physical address and the first physical block device identifier that are corresponding to the first virtual address; determine, according to a format of a virtual disk corresponding to the first virtual address, the first read/write identifier corresponding to the first virtual address; and create the address translation information set, where the address translation information set includes the correspondence between the first virtual address and each of the first physical address, the first physical block device identifier, and the first read/write identifier.

The processor 1010 may be specifically configured to: if the first virtual address is corresponding to a thick-provisioned virtual disk or a thin-provisioned virtual disk, determine that the first read/write identifier indicates readable and writable; if the first virtual address is corresponding to a differential mirror virtual disk, and the first virtual address is corresponding to a child image file, determine that the first read/write identifier indicates readable and writable; or if the first virtual address is corresponding to a differential mirror virtual disk, and the first virtual address is corresponding to a parent image file, determine that the first read/write identifier indicates read-only.

It should be understood that the read/write path determining apparatus 1000 according to this embodiment of the present disclosure may correspond to the read/write path determining method 300 according to the embodiment of the present disclosure, and the read/write path determining apparatus 800 according to the embodiment of the present disclosure. The foregoing and other operations and/or functions of the modules in the apparatus 1000 are respectively used to implement corresponding procedures of the methods shown in FIG. 3 to FIG. 7. For brevity, details are not described herein.

In the foregoing multiple embodiments of the read/write path determining apparatus, it should be understood that, in an implementation manner, a backend storage module, a first obtaining module, a second obtaining module, and a third obtaining module may be implemented by a processor by executing a program or an instruction that is in a memory (in other words, the backend storage module, the first obtaining module, the second obtaining module, and the third obtaining module may be implemented by means of mutual cooperation between the processor and a special instruction in a memory coupled with the processor); in another implementation manner, the backend storage module, the first obtaining module, the second obtaining module, and the third obtaining module may be separately implemented by using a dedicated circuit, and for a specific implementation manner, refer to the prior art, and details are not described herein; in still another implementation manner, the backend storage module, the first obtaining module, the second obtaining module, and the third obtaining module may be implemented by using a field-programmable gate array (FPGA), and for a specific implementation manner, refer to the prior art, and details are not described herein. The present disclosure includes but is not limited to the foregoing implementation manners. It should be understood that all solutions implemented according to the idea of the present disclosure shall fall within the protection scope of the embodiments of the present disclosure.

Figure 11:
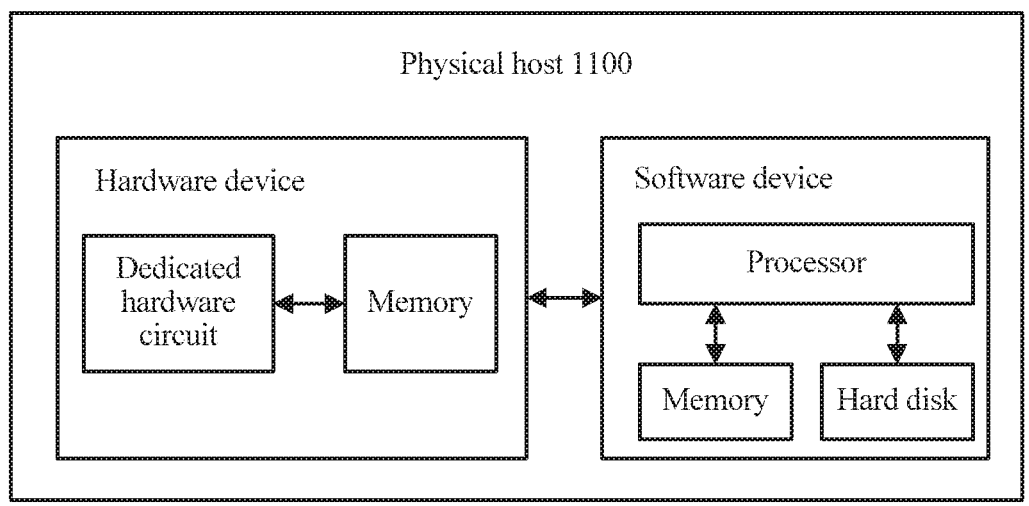
FIG. 11 is a schematic block diagram of a physical host according to an embodiment of the present disclosure.

An embodiment further provides a physical host. As shown in FIG. 11, a physical host 1100 may include two parts: a hardware device and a software device. The hardware device includes a hardware layer. The software device includes a host running on the hardware layer, and a virtual machine running on the host. The host further includes the read/write path determining apparatus 800 in the foregoing embodiment.

The hardware device may also be referred to as a "hardware processing module", or be simply referred to as "hardware" for short. The hardware device mainly includes a hardware circuit that implements some specific functions on the basis of dedicated hardware circuits such as an FPGA and an ASIC (probably with cooperation from another accessory device such as a memory). Generally, a processing speed of the hardware device is much faster than that of a general purpose processor. However, a function of the hardware device is hard to change once the function is set, and therefore, it is not flexible to implement the function of the hardware device, and the hardware device is generally used to process some fixed functions. It should be noted that, in an actual application, the hardware device may also include processors such as an MCU (microprocessor, such as a single-chip microcomputer) or a CPU. However, a main function of these processors is not to complete processing of big data but to perform some control. In this application scenario, a system with which these devices match is a hardware device.

The software device (or be simply referred to as "software") mainly includes a general purpose processor (such as a CPU) and some accessory devices (such as storage devices like a memory and a hard disk). Programming may be used to equip the processor with a corresponding processing function, and when the software is used to implement a function, the software device may be flexibly configured according to a service requirement, but a speed of the software device is generally slower than that of the hardware device.

In this embodiment, the software device is configured to determine an appropriate read/write path according to a read/write request, and the hardware device completes a read/write operation corresponding to the read/write request. Other functions of the software device and the hardware device are described in detail in the foregoing embodiments, and are not described herein.

Therefore, according to the read/write path determining apparatus in this embodiment of the present disclosure, an appropriate read/write path is determined according to a read/write request and an address translation information set, so that both storage performance and a storage function can be considered.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A read/write path determining method for use by a physical host comprising a hardware layer, a host running on the hardware layer, and a virtual machine running on the host, wherein the host comprises a block device and a virtual block device, and the method comprises:

obtaining, by the host, a first read/write request of the virtual machine, wherein the first read/write request comprises a first virtual address;

determining whether to enable an advanced storage service;

in response to determining that the advanced storage service is not enabled, searching for the first virtual address in an address translation information set comprising a correspondence between a virtual address and information about a physical block device, wherein the information about the physical block device comprises a read/write identifier; and if the address translation information set comprises the first virtual address, and the first read/write request is a read request, processing the first read/write request by using a block device corresponding to the first virtual address; or if the address translation information set comprises the first virtual address, the first read/write request is a write request, and a first read/write identifier corresponding to the first virtual address indicates readable and writable, processing the first read/write request by using the block device; or if the address translation information set comprises the first virtual address, the first read/write request is a write request, and a first read/write identifier corresponding to the first virtual address indicates read-only, processing the first read/write request by using the virtual block device; or if the address translation information set does not comprise the first virtual address, processing the first read/write request by using the virtual block device.

2. The method according to claim 1, wherein:

the information about the physical block device further comprises a physical block device identifier and a physical address; and processing the first read/write request by using a block device corresponding to the first virtual address comprises:

translating the first read/write request into a block device read/write request, wherein the block device read/write request comprises a first physical address and a first physical block device identifier that are corresponding to the first virtual address, and processing the block device read/write request by using the block device corresponding to the first virtual address.

3. The method according to claim 1, wherein if the address translation information set comprises the first virtual address, the first read/write request is a write request, and the first read/write identifier corresponding to the first virtual address indicates read-only, the method further comprises:

deleting an initial record corresponding to the first virtual address from the address translation information set.

4. The method according to claim 3, further comprising:

obtaining, according to the first read/write request, a first physical address, a first physical block device identifier, and a first read/write identifier that are corresponding to the first virtual address; and adding, into the address translation information set, a correspondence between the first virtual address and each of the first physical address, the first physical block device identifier, and the obtained first read/write identifier.

5. The method according to claim 1, wherein if the address translation information set does not comprise the first virtual address, the method further comprises:

obtaining, according to the first read/write request, a first physical address, a first physical block device identifier, and a first read/write identifier that are corresponding to the first virtual address; and adding, into the address translation information set, a correspondence between the first virtual address and each of the obtained first physical address, the first physical block device identifier, and the obtained first read/write identifier.

6. The method according to claim 1, wherein determining whether to enable an advanced storage service comprises:

obtaining a path switching instruction, wherein the path switching instruction is used to instruct whether to enable the advanced storage service; and determining, according to the path switching instruction, whether to enable the advanced storage service.

7. The method according to claim 1, wherein:

the information about the physical block device further comprises a physical address and a physical block device identifier; and if the address translation information set comprises the first virtual address, the method further comprises:

obtaining a first physical address and a first physical block device identifier that are corresponding to the first virtual address, determining, according to a format of a virtual disk corresponding to the first virtual address, the first read/write identifier corresponding to the first virtual address, and creating the address translation information set, wherein the address translation information set comprises the correspondence between the first virtual address and each of the first physical address, the first physical block device identifier, and the first read/write identifier.

8. The method according to claim 7, wherein determining, according to a format of a virtual disk corresponding to the first virtual address, the first read/write identifier corresponding to the first virtual address comprises:

if the first virtual address is corresponding to a thick-provisioned virtual disk or a thin-provisioned virtual disk, determining that the first read/write identifier indicates readable and writable;

if the first virtual address is corresponding to a differential mirror virtual disk, and the first virtual address is corresponding to a child image file, determining that the first read/write identifier indicates readable and writable; or if the first virtual address is corresponding to a differential mirror virtual disk, and the first virtual address is corresponding to a parent image file, determining that the first read/write identifier indicates read-only.

9. The method according to claim 1, wherein obtaining, by the host, a first read/write request of the virtual machine comprises:

obtaining a second read/write request of the virtual machine from an input output IO ring shared by a storage frontend and a storage backend, wherein the second read/write request comprises a second virtual address; and splitting the first read/write request off from the second read/write request, wherein the first virtual address is a partial virtual address in the second virtual address.

10. A read/write path determining apparatus for use in a physical host having a virtual machine configured to run on the physical host, the apparatus comprising:

a storage backend module, configured to:

obtain a first read/write request of the virtual machine, wherein the first read/write request comprises a first virtual address, determine whether to enable an advanced storage service; and in response to determining that the advanced storage service is not enabled, search for the first virtual address in an address translation information set comprising a correspondence between a virtual address and information about a physical block device, wherein the information about the physical block device comprises a read/write identifier;

a block device, configured to process the first read/write request:

if the address translation information set comprises the first virtual address, and the first read/write request is a read request, or if the address translation information set comprises the first virtual address, the first read/write request is a write request, and a first read/write identifier corresponding to the first virtual address indicates readable and writable; and a virtual block device, configured to process the first read/write request:

if the address translation information set comprises the first virtual address, the first read/write request is a write request, and a first read/write identifier corresponding to the first virtual address indicates read-only, or if the address translation information set does not comprise the first virtual address.

11. The apparatus according to claim 10, wherein:

the information about the physical block device further comprises a physical block device identifier and a physical address;

the storage backend module is further configured to:

translate the first read/write request into a block device read/write request, wherein the block device read/write request comprises a first physical address and a first physical block device identifier that are corresponding to the first virtual address; and the block device is configured to process the block device read/write request.

12. The apparatus according to claim 10, wherein the storage backend module is further configured to:

if the address translation information set comprises the first virtual address, the first read/write request is a write request, and the first read/write identifier corresponding to the first virtual address indicates read-only, delete an initial record corresponding to the first virtual address from the address translation information set.

13. The apparatus according to claim 12, further comprising:

a first obtaining module, configured to obtain, according to the first read/write request, a first physical address, a first physical block device identifier, and a first read/write identifier that are corresponding to the first virtual address; and wherein the storage backend module is further configured to add, into the address translation information set, a correspondence between the first virtual address and each of the first physical address, the first physical block device identifier, and the first read/write identifier that are obtained by the first obtaining module.

14. The apparatus according to claim 10, further comprising:

a first obtaining module, configured to:

if the address translation information set does not comprise the first virtual address, obtain, according to the first read/write request, a first physical address, a first physical block device identifier, and a first read/write identifier that are corresponding to the first virtual address; and wherein the storage backend module is configured to add, into the address translation information set, a correspondence between the first virtual address and each of the first physical address, the first physical block device identifier, and the first read/write identifier that are obtained by the first obtaining module.

15. The apparatus according to claim 10, further comprising:

a second obtaining module, configured to obtain a path switching instruction, wherein the path switching instruction is used to instruct whether to enable the advanced storage service; and wherein the storage backend module is further configured to determine, according to the path switching instruction, whether to enable the advanced storage service.

16. The apparatus according to claim 10, further comprising:

a third obtaining module, configured to:

if the address translation information set comprises the first virtual address, obtain a first physical address and a first physical block device identifier that are corresponding to the first virtual address, and determine, according to a format of a virtual disk corresponding to the first virtual address, the first read/write identifier corresponding to the first virtual address; and wherein the storage backend module is further configured to create the address translation information set, wherein the address translation information set comprises the correspondence between the first virtual address and each of the first physical address, the first physical block device identifier, and the first read/write identifier.

17. The apparatus according to claim 16, wherein the third obtaining module is configured to:

if the first virtual address is corresponding to a thick-provisioned virtual disk or a thin-provisioned virtual disk, determine that the first read/write identifier indicates readable and writable;

if the first virtual address is corresponding to a differential mirror virtual disk, and the first virtual address is corresponding to a child image file, determine that the first read/write identifier indicates readable and writable; or if the first virtual address is corresponding to a differential mirror virtual disk, and the first virtual address is corresponding to a parent image file, determine that the first read/write identifier indicates read-only.

18. The apparatus according to claim 10, wherein the storage backend module is configured to:

obtain a second read/write request of the virtual machine from an input output (IO) ring shared by a storage frontend and a storage backend, wherein the second read/write request comprises a second virtual address; and split the first read/write request off from the second read/write request, wherein the first virtual address is a partial virtual address in the second virtual address.

19. A physical host, comprising:

a hardware layer;

a host running on the hardware layer and a virtual machine running on the host, and the host comprises a read/write path determining apparatus comprising:

a storage backend module, configured to:

obtain a first read/write request of the virtual machine, wherein the first read/write request comprises a first virtual address, determine whether to enable an advanced storage service; and in response to determining that the advanced storage service is not enabled, search for the first virtual address in an address translation information set comprising a correspondence between a virtual address and information about a physical block device, wherein the information about the physical block device comprises a read/write identifier;

a block device, configured to process the first read/write request:

if the address translation information set comprises the first virtual address, and the first read/write request is a read request, or if the address translation information set comprises the first virtual address, the first read/write request is a write request, and a first read/write identifier corresponding to the first virtual address indicates readable and writable; and a virtual block device, configured to process the first read/write request:

if the address translation information set comprises the first virtual address, the first read/write request is a write request, and a first read/write identifier corresponding to the first virtual address indicates read-only, or if the address translation information set does not comprise the first virtual address.

* * * * *